(12) United States Patent
Stevens et al.

(10) Patent No.: US 10,277,457 B2
(45) Date of Patent: Apr. 30, 2019

(54) NETWORK ACCESS FAULT REPORTING

(71) Applicant: BRITISH TELECOMMUNICATIONS PUBLIC LIMITED COMPANY, London (GB)

(72) Inventors: Timothy Stevens, London (GB); Philip Coackley, London (GB); Andrew Davis, London (GB); Douglas Williams, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/322,896

(22) PCT Filed: Jun. 4, 2015

(86) PCT No.: PCT/GB2015/051624
§ 371 (c)(1),
(2) Date: Dec. 29, 2016

(87) PCT Pub. No.: WO2016/001620
PCT Pub. Date: Jan. 7, 2016

(65) Prior Publication Data
US 2017/0141954 A1 May 18, 2017

(30) Foreign Application Priority Data
Jun. 30, 2014 (GB) .................................. 1411566.1

(51) Int. Cl.
*H04L 12/24* (2006.01)
*H04W 24/04* (2009.01)
*H04W 88/08* (2009.01)

(52) U.S. Cl.
CPC ........ *H04L 41/0686* (2013.01); *H04L 41/069* (2013.01); *H04W 24/04* (2013.01); *H04W 88/08* (2013.01)

(58) Field of Classification Search
CPC .................................................. H04L 41/0686
(Continued)

(56) References Cited

U.S. PATENT DOCUMENTS 9,578,620 B2 * 2/2017 Krening .............. H04W 64/003
2011/0032816 A1 * 2/2011 Isaksson ................ H04W 48/12
370/225

(Continued)

FOREIGN PATENT DOCUMENTS

EP 2 739 093 6/2014
WO WO 2013/128242 9/2013

OTHER PUBLICATIONS

International Search Report for PCT/GB2015/051624, dated Aug. 24, 2015, 2 pages.
(Continued)

*Primary Examiner* — Samina F Choudhry
(74) *Attorney, Agent, or Firm* — Nixon & Vanderhye P.C.

(57) ABSTRACT

A wireless access point (10) connected to a fixed telecommunications network (12) broadcasts codes relating to one or more network identities (100, 101) identifying availability of wireless connection to the access point, If connection to the telecommunications network (12) is lost, it suspends one of the identity codes (100) and replaces it with a special identity code for a network identity (102) configured to co-operate with a mobile terminal (53) equipped to recognize the special identity code and transmit a message over another communications link (6, 49) to alert a service center (7) to the fault (13).

19 Claims, 4 Drawing Sheets

(58) Field of Classification Search
USPC .......................................................... 370/311
See application file for complete search history.

(56) References Cited

U.S. PATENT DOCUMENTS

2014/0126356 A1    5/2014  Lee et al.
2015/0172968 A1*   6/2015  Lund ................. H04W 36/0066
                                                              455/411
2015/0350920 A1*  12/2015  Tapia .................... H04W 16/18
                                                              455/449

OTHER PUBLICATIONS

Office Action dated May 7, 2018, issued in corresponding EP Application No. 15 728 585.9 (5 pages).
Response dated Jul. 5, 2018 in Office Action dated May 7, 2018, issued in corresponding EP Application No. 15 728 585.9 (10 pages).
Office Action dated Aug. 13, 2018, issued in corresponding EP Application No. 15 728 585.9 (5 pages).
Amendments dated Nov. 16, 2016 made in International Application No. PCT/GB2015/051624 (8 pgs.).
Office Action dated May 7, 2018 issued in European Application No. 15 728 585.9 (5 pgs.).
Response to the May 7, 2018 Office Action, dated Jul. 5, 2018 issued in European Application No. 15 728 585.9 (18 pgs.).
Office Action dated Aug. 13, 2018 issued in European Application No. 15 728 585.9 (5 pgs.).
Response to the Aug. 13, 2018 dated Nov. 20, 2018 issued in European Application No. 15 728 585.9 (18 pgs.).

* cited by examiner

NETWORK ACCESS FAULT REPORTING

This application is the U.S. national phase of International Application No. PCT/GB2015/051624 filed 4 Jun. 2015, which designated the U.S. and claims priority to GB Patent Application No. 1411566.1 filed 30 Jun. 2014, the entire contents of each of which are hereby incorporated by reference.

BACKGROUND AND SUMMARY

This invention relates to connection of data terminals to a data network through wireless access points, and in particular to fault reporting in the event of failure of a primary connection between an access point and the data network.

Connection to data networks such as the Internet has become an integral part of many domestic and small business activities. The rapid wide-scale adoption of this technology by domestic and small to medium business enterprises was facilitated by the use of the pre-existing fixed telephone network to connect the customer premises to the network. Such lines use a wide variety of technologies ranging from modern optical fibre-to-the-premises, to older electrical connections using copper (and even aluminium) lines, with joints & junctions. Even these older lines are in many cases capable of delivering broadband internet services, although many were never designed to do so.

However, all types of line may develop faults that may either completely interrupt the signals, or may only permit a degraded service (voice but no internet, intermittent faults etc.). Additionally, faults and failures may occur in the internet service despite the underlying network being apparently fault-free. There are two classes of such faults, referred to here as "hard" and "soft". Hard faults have some physical cause, where the transmission properties of the line are affected. One such example is when the ringing of an incoming telephony call can cause the broadband signal to be lost. Soft faults may be caused by network-level authentication failures, software or database problems in the ISP's equipment, configuration or billing issues etc. Whilst it is important that all faults are identified and rectified, intermittent faults such as these may be particularly costly for the ISP, and annoying for the customer. Furthermore, in a deregulated market the physical line may be provided by one operator and the internet service by another. In such a case, it may be unclear in the event of a failure which provider is responsible, or even to whom the fault should be reported.

Typically, one or more user terminals will connect to the public network through a local area network (LAN) controlled by a access point, which mediates data messages between the user terminal and the internet, including providing modem functions. Connection between the terminal and the access point may be by an Ethernet or Powerline connection, but increasingly wireless connection is used (a Wireless Local Area Network "WLAN") as this allows terminals to be placed anywhere within wireless range of the access point.

Terminals connected to the same access point may also communicate between each other without going through the external network. To provide privacy for such activity, and to ensure the access point is not misused by unauthorised persons to gain access to the internet, access points typically have access protection to ensure only users with the correct access credentials can use it.

Public wireless access points also exist which allow any users with appropriate terminal equipment to connect to the Internet. These access points may be dedicated public access points provided by commercial enterprises to attract custom, or parts of the capacity of privately-owned access points made available to the public by their owners in exchange for reciprocal access rights to other participants' access points.

Failure of the primary connection between an access point and the network can be problematic as users have become reliant on their internet connections for many business and domestic purposes. In many cases a service provider's helpdesk, or a troubleshooting application, can guide the user to establish a replacement connection to the Internet through a public wireless access point whilst the fault in the primary connection is under repair.

Although several types of fault can be automatically identified by the Internet Service Provider, there are other types that require detection and reporting from the customer end. In some cases, the internet connection may fail despite the physical characteristics of the line appearing to be within normal limits, and voice calls operating correctly. Many troubleshooting operations can be made available to the user on the Internet, but if it is the Internet connection itself which has failed, that information is not accessible unless the user has had the foresight to download a diagnostic application or the like in advance. Consequently, such failures account for a very high proportion of calls to network operators' helpdesks—and even that course of action may not be available if the user's telephone line uses the same connection as the Internet connection, and the fault has affected both services. Such systems also require the user to become aware of the fault and report it before the network operator can attend to it.

Many wireless access points intended for small business or domestic use are supplied with two separate network interfaces: a private interface for the subscribed broadband service, and a public interface to provide access to subscribers to the public service. The two interfaces use the same fixed-line access connection, the architecture of the access point keeps the two interfaces completely separate, so that public-side users cannot access the private side of the access point, and also private traffic takes priority over public traffic.

In residential areas, there will typically be multiple access points visible, within wireless communication range of each other. These access points have to be aware of each other in order to select a channel on which to operate which is free from interference from neighbouring access points. If a user terminal can detect more than one access point, the access point to which the user has access rights to the private side has to be identified (either by a user input or by data stored on the user terminal) before connection can be attempted.

The applicant company's existing International Patent Application WO2014/083296 describes a process for connecting a failed line's access point to an adjacent public access point in order for the failed line's user to maintain internet access. He may use this access to report the faulty access point. However, this requires the user to initiate the process. Consequently if a fault develops when a user is not present, he will not discover the fault until he wishes to use the internet connection.

The applicant company's existing International Patent Application GB2014/000442 provides a wireless access point which monitors for loss of connection between its network interface and a network, and establishes wireless connection to a network-based service centre through its wireless interface and a second wireless access point which still has a network connection, in order to transmit a message to a service centre indicative of the loss of the network connection.

The present invention provides a different approach, which does not require that another access point with a working backhaul network connection be available within range of the first, failed one. According to the present invention, there is provided a method for reporting faults in a telecommunications network wherein
   a wireless access point transmits one or more identity codes identifying respective functional interfaces through which network connections are available,
   the access point suspends one of the identity codes if connection to the telecommunications network is lost, and replaces it with a special identity code indicative of such lost connection, associated with a further functional interface, wherein a mobile telecommunication terminal detects the special identity code transmitted by the access point and generates an alert message over the further functional interface.

A suitably-equipped mobile communications terminal can then detect the special identity code transmitted by the access point and generate an alert message.

After detection that connection to a network has been lost, the access point may remain capable of providing services not dependant on the telecommunications network, and may continue to transmit another identity code, in respect of such non-network services.

Preferably, the mobile unit is arranged to select connection to a wireless access point transmitting the special identity code in preference to any other wireless access point that it can detect.

The access point may cease transmission of the alert in response to an acknowledgement from the mobile unit.

The mobile unit, having generated the alert message, may then disconnect from the access point and seek a second wireless access point through which to make a new wireless connection over which to transmit the alert message. It may store the alert message it has generated until it has established a connection to a report logging centre through a second access point or, where the alert message is transmitted using the first access method, the mobile communications terminal may transmit the alert message to a report logging centre using a second access method. Alternatively, the alert message is displayed on an output of the mobile unit.

Another aspect of the invention provides an access point for wireless communication having a wireless interface for communication with one or more mobile terminals and a network interface for connection to a communications network such that the mobile terminals may communicate with each other and the communications network, the access point having:
   a wireless access control system for transmitting one or more identity codes over the wireless interface to indicate respective functional interfaces through which respective network connections are available and controlling connection by mobile terminals to the access point,
   a network monitor for monitoring the connection to the network interface
   a fault processor for controlling the wireless access control system in response to the network monitor by suspending transmission of one of the identity codes if connection to the network is lost, and replacing it with a special identity code indicative of such lost connection and associated with a further functional interface, wherein the access point is configured to communicate with a mobile telecommunications terminal detecting the special identity code transmitted by the access point to generate an alert message over the further functional interface. The invention also provides a mobile communications terminal arranged for wireless communication with a network through a wireless access point, and having means for establishing connection with a wireless access point over a functional interface in response to detection of an identity code transmitted by the access point identifying availability of network connections over the functional interface,
   the mobile communications terminal being arranged to generate an alert message in response to detection of a predetermined special identity code associated with a further functional interface, indicative that connection has been interrupted between the network and the access point transmitting the special identity code, wherein the mobile communications terminal is arranged to disconnect from the access point having generated the alert message, and to attempt to make a new wireless connection to a second access point.

The access point is therefore enabled to report the connection failure to any suitably-equipped mobile unit that comes within range.

The mobile unit can then pass on the report to where it is needed by any suitable means. This may be through another access point which is within range of the mobile unit, or later comes within range of the mobile unit as it moves around. The alert may use the same protocol, or any other protocol for which the mobile unit is configured, for example using an SMS text message.

The report, or a compilation of several such reports, may instead be presented to the user of the mobile unit, for example a field technician sent to investigate connection problems in a particular area, who would use the mobile unit to seek out access points generating the special identity code. Such reports may be used to populate a database using other data, for example time and location (GPS) data, to allow further analysis of the connection problem. Such data may be collected over a period of time to allow analysis of intermittent problems.

The invention allows connection or service faults to be automatically reported even when the network connection line itself has failed, provided the access point itself is still operational.

This automatic fault reporting saves costs for the service provider as it reduces the need for a helpdesk, and may offer improved fault-fixing. Additionally, many faults would be auto-reported before the customer even becomes aware of them: for example if the fault arises when the customer is asleep or away from home, providing the access point has been left powered up and connected. Consequently the fault can be identified, reported, and hopefully rectified, before the user next wishes to use the connection.

The invention may be implemented by software installed in the access point, either on manufacture, or by subsequent upgrade of the programming of the access point by installation of software provided on a physical carrier (e.g. a CD-ROM) or by download over the internet connection.

BRIEF DESCRIPTION OF THE DRAWINGS

An embodiment of the invention will now be described with reference to the drawings in which.

DETAILED DESCRIPTION OF PRESENT EXAMPLE EMBODIMENTS

Figure 1:
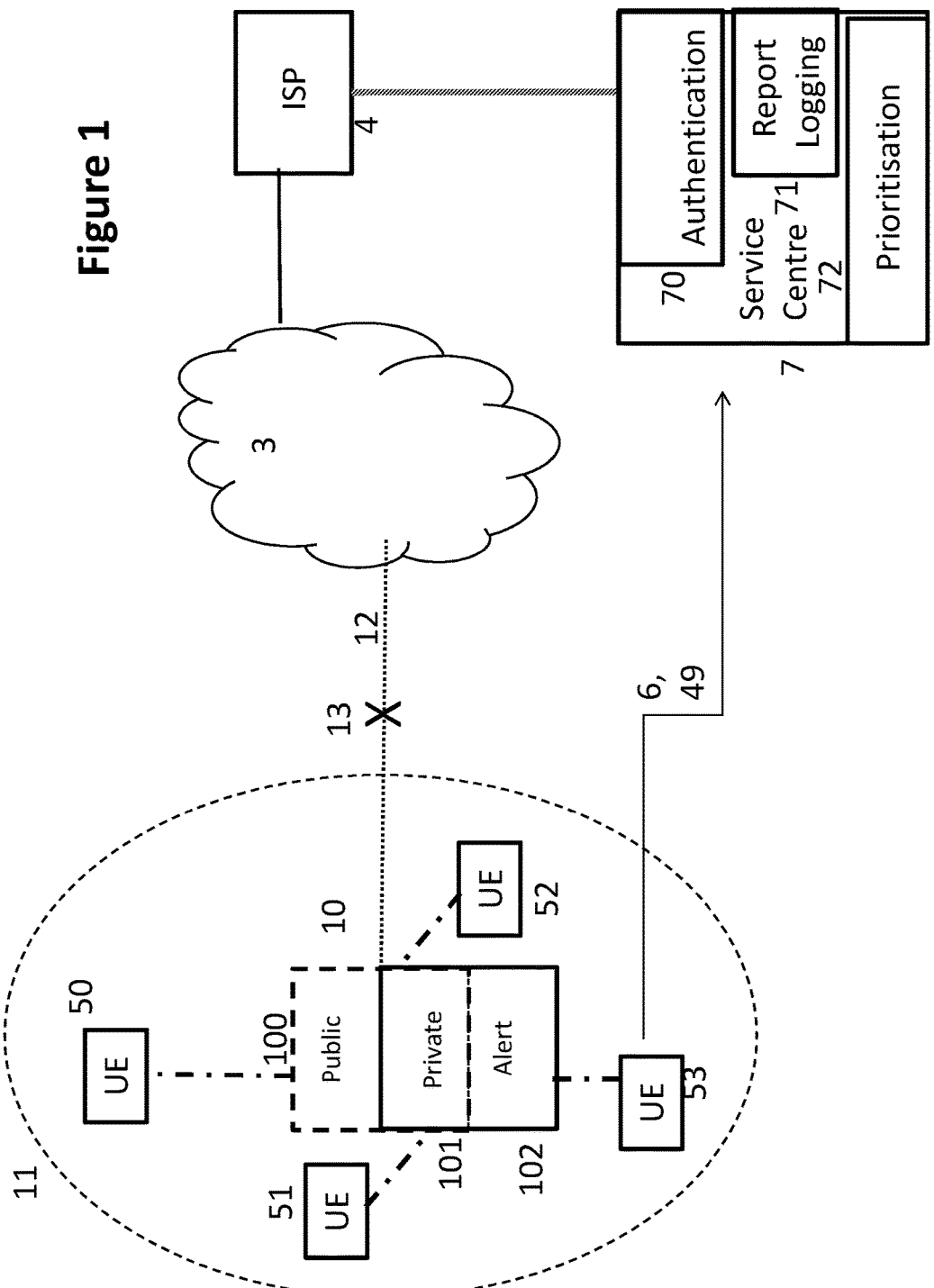
FIG. 1 illustrates a typical wireless LAN in which the invention may be implemented

FIG. 1 depicts a typical arrangement. A wireless access point 10 has a wireless range 11, and a fixed-line backhaul connection 12 through a telecommunications network 3 to an internet service provider platform 4.

The access point 10 is arranged to provide wireless access facilities to individual user terminals using two separate functional interfaces, 100, 101. The first of these interfaces 100 is a public access facility, available to any user terminal 50 having an account with the service provider 4. The second interface 101 is a private access facility, available only to user terminals 51, 52 which can be authenticated as having access rights to that facility. Such authentication can be provided for example by use of a password known only to the owner of the respective wireless access point. The private interface 101 provides a more comprehensive service to those users 51, 52 authorised to use it than is provided by the public interfaces 100, for example by giving priority access to the available bandwidth, and allowing terminals 51, 52 connected to it to interwork as a wireless local area network (WLAN), independently of the internet (3, 4). Each interface has its own identity code (SSID) which is recognisable by mobile units authorised to use it.

In normal operation, a user terminal 51 would gain access to the internet 4 using the private (password-protected) interface 101 of the access point 10 with which it is associated, provided it is in range 11, and would only use the public interface of another access point if it is out of range of its own access point 10. Note that while the public interface 100 typically allows a client to connect to the access point with no password required, the connected user will generally be limited to accessing a landing or challenge page at the ISP 4 unless he provides further access credentials.

In FIG. 1, a connection failure 13 is depicted on the line 12 between the access point 10 and the ISP 4. Such a failure may be a physical break in the line, an intermittent fault, a service fault, or some other configuration error, the effect of which is to interrupt the customer's internet access. In some cases the ISP 4 may be able to automatically detect this failure and/or it may be immediately apparent to the customer. However, in many other cases some function of the connection 12 (e.g. voice telephony) may continue to function normally. In other cases a fault could occur when the user is not present, or not using the connection at the time. Nevertheless, the access point 10 may itself detect the line or service fault 13. For example the access point may transmit routine "Ping" or link status requests, DNS lookup probes, etc from the access point 10 to the ISP 4, and respond according to the receipt or otherwise of a response.

In this embodiment of the present invention, when such a fault is detected the access point replaces or reassigns the public access interface 100, using a special, third, access interface 102. This third interface has its own access identity (SSID). The closure of the public interface prevents mobile units attempting to use the access point 10 to connect to the Internet 4. The access identity of the third interface is made available to mobile units 53 that are equipped to provide a special reporting function. Such a mobile unit will be described later with reference to FIG. 3.

Figure 2:
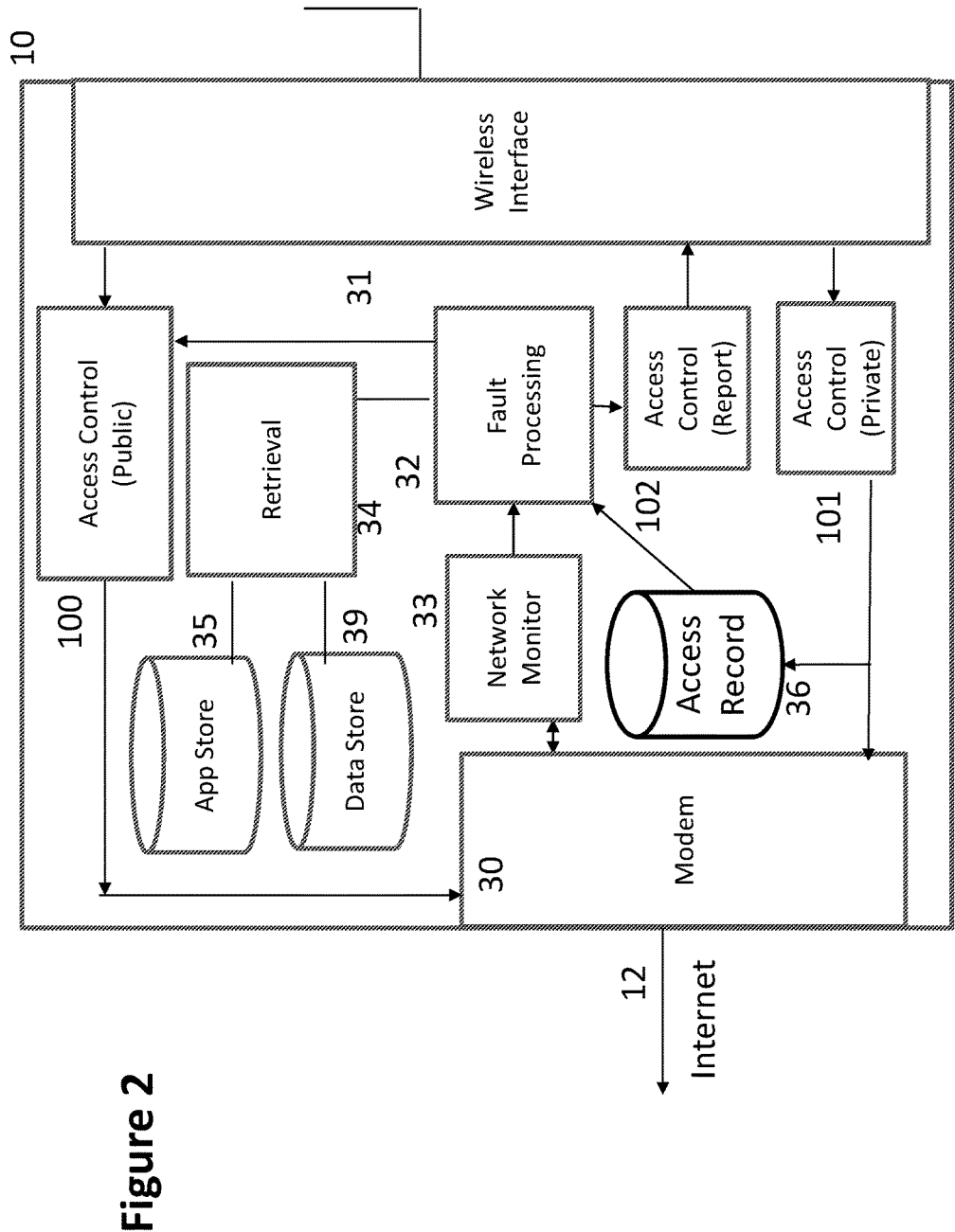
FIG. 2 illustrates the relevant functional elements of an access point arranged to operate according to the invention

FIG. 2 depicts the functional elements of the access point 10 that are relevant to the invention. It will be appreciated that these elements may be implemented in software maintained in a store 35 in the access point, either installed in the access point on manufacture or downloaded subsequently. The access point 10 router comprises a modem/network interface 30 for connection to the internet 3 over a link 12, and a radio interface 31 for providing a wireless interface to one or more data terminals 50, 51, 52, 53. Communication between the various interfaces 30, 31 of the router 3, and the terminals 50, 51, 52, 53 is controlled by access control systems 100, 101, 102, respectively giving public, private and special alert access rights to user terminals requiring use of the access point.

In one embodiment of the invention, a store 36 is maintained which records the access attempts to the internet 4 made through the private access control system 101.

The condition of the network link 12 is monitored by a monitoring system 33. Also provided is a store 35 for data processing applications, which may be retrieved using a retrieval processor 34, and a further store 39 for authentication and identity data. In the preferred embodiment the store 35 is used to download programming information to a central processor controlling the operation of the access point, to allow it to operate as a fault reporting processor 32 in additional to its conventional functions, and in particular to allow the alerting access control system 102 to report line faults, as will be described. If a line fault is detected, the fault processor shuts down the public access control system 100 and initiates the special access control system 102 to provide authentication processing to allow the automatic reporting of a line fault 13 to a central monitoring facility 7. As this alerting access control system 102 only operates when the public access control system 100 is not operating, they may share many functional components. However, they have different identity codes (SSID), and therefore appear, to external mobile units 50, 51, 52, 53, to be different access points, with different capabilities and access rights.

Referring again to FIG. 1, a central monitoring facility 7 includes an authentication processor 70, a fault logging processor 71, and a prioritisation processor 72, and its functioning will be described later.

The applications in the store 35 may be loaded in the access point 10 on manufacture, or downloaded from a service provider over the Internet 3 and connection 12 after installation, in order to upgrade its operation and install new capabilities. The identity data in the store 39 may also be hard-wired into the terminal, downloaded from the network, or entered by the user from one of the terminals 51.

In FIG. 1, a connection failure 13 is depicted on the line 12 between the first access point 10 and the ISP 4. Such a failure may be a physical break in the line, an intermittent fault, a service fault, or some other configuration error, the effect of which is to interrupt the customer's internet access. In some cases the ISP 4 may be able to automatically detect this failure and/or it may be immediately apparent to the customer. However, in many other cases some function of the connection 12 (e.g. voice telephony) may continue to function normally. In other cases the fault may occur when the user is not present, or not using the connection at the time. Nevertheless, the access point 10 may itself detect the line or service fault 13. For example the line monitor 33 may transmit routine "Ping" or link status requests, DNS lookup probes, etc from the access point 10 to the ISP 4, and respond according to the receipt or otherwise of a response.

Figure 3:
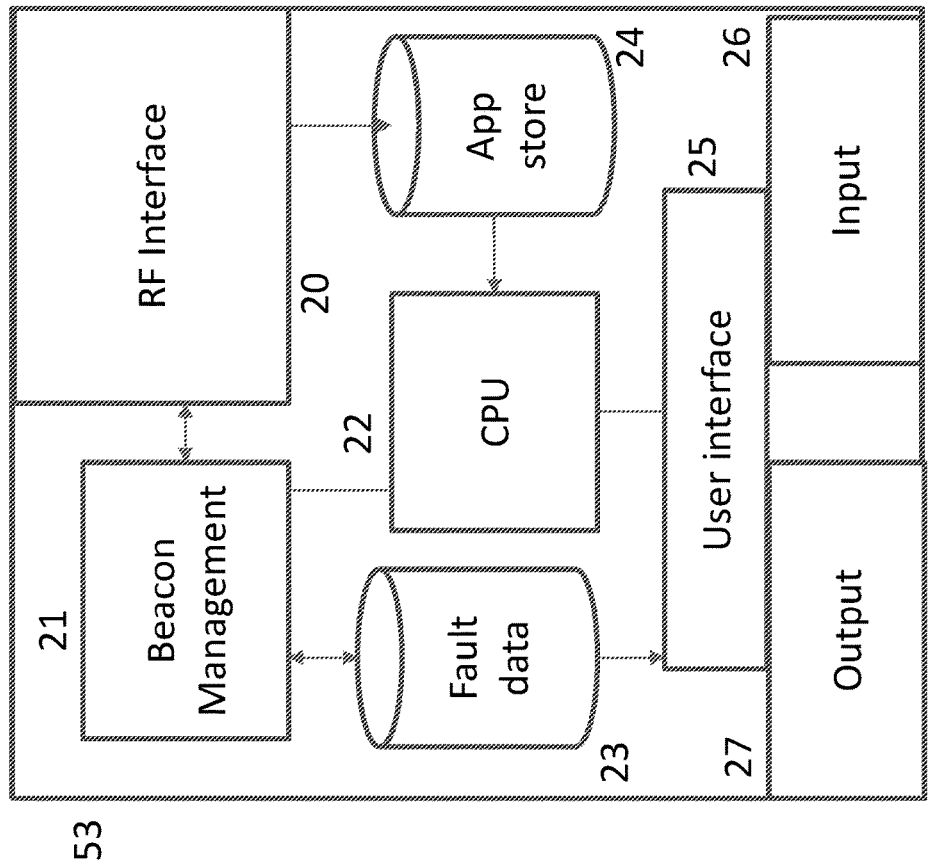
FIG. 3 illustrates the relevant functional elements of a mobile unit arranged to operate according to the invention

The relevant functional elements of a user handset 53 capable of performing the invention are depicted in FIG. 3. The handset may be a conventional programmable terminal ("Smartphone", tablet or laptop), with the necessary capabilities downloaded to an application store 24.

As is conventional, the handset has a central processor 22 which mediates the operation of the other elements. A user interface 25 mediates inputs 26 from a keyboard, touchscreen or the like, and generates audio or visual outputs 27 to the user.

A wireless interface 20 for transmitting and receiving radio frequency signals according to the wifi (WLAN) protocol, and may be capable of operating on other protocols such as GSM, SMS, etc. As part of the radio operation, the handset 53 has a beacon management system which detects identity signals ("beacons" or SSIDs) transmitted from the access control systems of base stations in the area (e.g the access control systems 100, 101, 102 of the base station 10 depicted in FIG. 1) and received by the RF interface 20, and exchanges data with such base stations to determine if connection should be established between the handset 53 and the base station 10. This determination will depend on factors such as signal strength and quality, and whether the handset 53 has the correct access rights for that access control system. For example, any handset 53 will be able to connect to the base station 53 using the public access control system 100 if that system is enabled, but will only be able to connect to the private access control system 101 or the reporting access control system 102 if it has the necessary access rights stored in the application store 24, or if the user can provide a password using the user interface 26. Should both private and public SSIDs be detected, a typical handset would be arranged to select a private SSID to which it has access rights in preference to a public one, as this gives the user more facilities, (such as access to other terminals on the same local area network), and usually better bandwidth. In the present invention, an application stored in the "app store" 24 causes the handset 53 to select, or switch to, an SSID carrying an identity indicative of the reporting access control system 102 of a nearby access point in preference to any other SSID it may detect. Once connection is established, the terminal 32 can receive a fault report from the access point, which can be stored in a fault data store 23. If the terminal is for use by a field technician who can attend to the fault, the report can be displayed on the output 27 of the user terminal. Alternatively, it may be transmitted over the RF interface 20 to a network-based fault reporting system when the terminal 32 is next connected to a working connection using the same Wifi protocol, or a different protocol such as the SMS system). This facility allows the application to be installed in any suitable handset 53, allowing a fault to be reported by any terminal in the area without any action required of the user of that terminal.

In the event of a cluster of access points all transmitting such SSIDs, the terminal can connect to each in turn, collecting fault data from each one. This may be achieved by having each access point shut down its "alarm" SSID 102 once a fault report has been transmitted to the terminal 32. Alternatively, the terminal 32 may be arranged to disregard any SSID for which it already has a fault report.

It may happen that one or more of the mobile units 50, 51, 52 already connected to the access point may be equipped with the special reporting function and may be arranged to switch to the alert SSID in order to carry out this function. They would then attempt to seek connection to another access point to re-establish connection to the Internet 3 or, if they have authorisation for the private SSID, reconnect to the private WLAN 101. If none of the mobile units 50, 51, 52 have this capability, the access point transmits the beacon 102 until such a mobile unit 53 comes into range and establishes contact.

Figure 4:
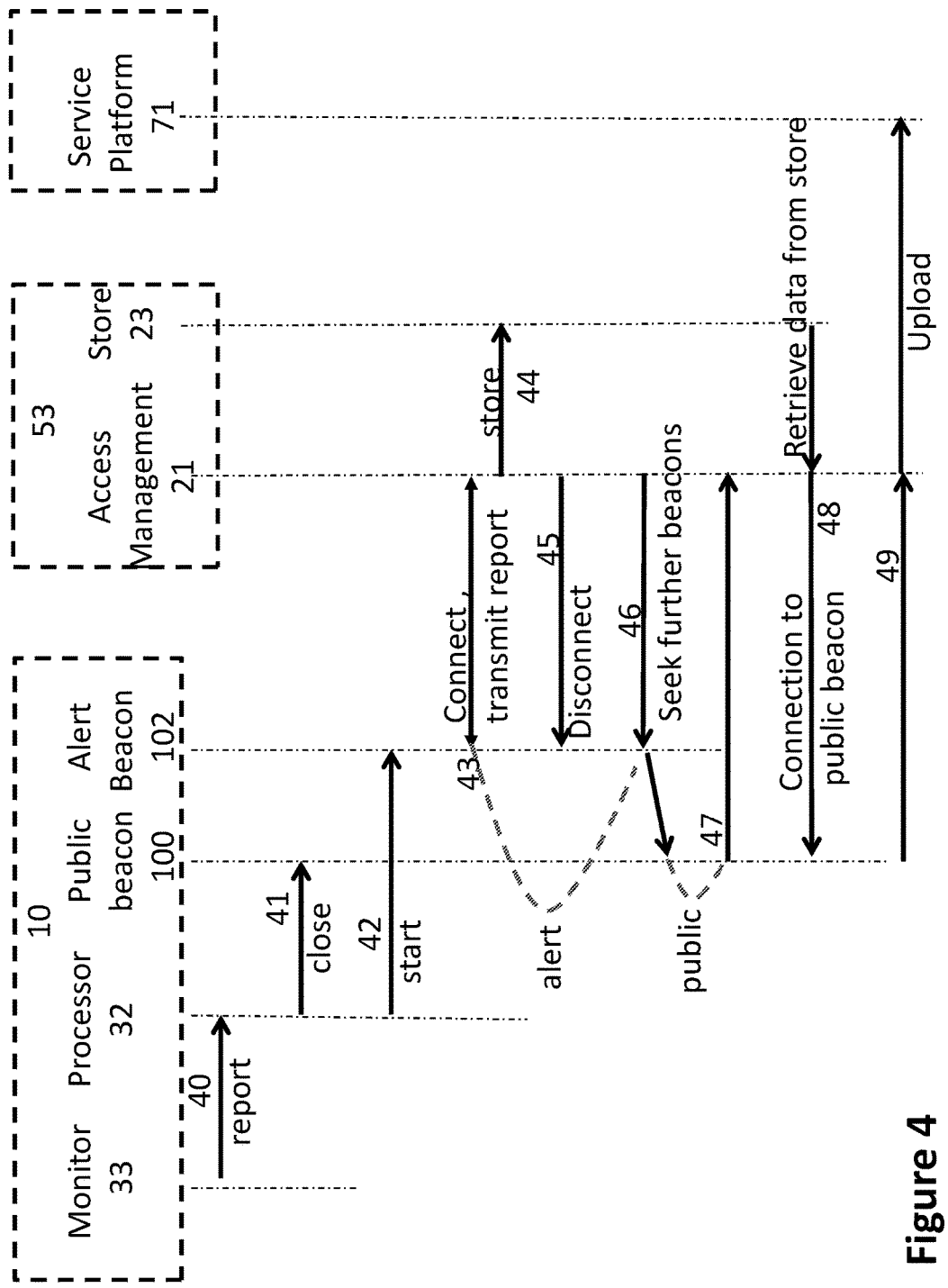
FIG. 4 is a sequence diagram indicating the interactions between the various elements which co-operate in the performance of a first embodiment of the invention.

FIG. 4 is a sequence diagram indicating the interactions between the various elements which co-operate in the performance of the invention. More specifically, it depicts the access point 10, mobile terminal 53 and service platform 71.

In the access point, if the monitor 33 detects a loss of connection between the modem 30 and the Internet 12 it transmits a report 40 to the processor 32, which ceases operation of the public beacon 100 (41) to operation of the alert beacon 102 (42). As has been discussed, rather than having a separate access control system, this may be done by switching from an SSID authorised for public use to one only recognised by terminals programmed to operate according to the invention.

The access management systems 21 of terminals 53 capable of performing the invention, such as that depicted in FIG. 3, are arranged to preferentially connect to the SSID identifying an alert should they detect it, switching from any other beacon they may currently be using either immediately or, if a session is in progress, at a suitable interruption in the data stream. This switch to the alerting SSID 102 may be as a result of the terminal 53 coming into range of a beacon that is already transmitting, or it may already be in range when the beacon 102 starts transmission. In the latter case, it may have been using one of the beacons 100, 101 of the same access point, or it may have been connected to another access point.

Once the access point 10 has established contact with a suitable terminal 53, it transmits a fault report 43 to the terminal 53. The terminal 53 stores the report in a data storage medium 23 (step 44), and then disconnects from the access point 10 (step 45). Depending on the nature of the fault, the access point 10 may then be configured to shut down the alert beacon 102, to prevent multiple reports of the same fault. However, it may be kept running if the nature of the fault is such that repeated reports are desired: for example if the fault may be transient or intermittent it may be desirable for the service platform to receive multiple reports in order to determine whether the fault has cleared. Alternatively, the beacon 102 could be shut down (45) after the first report 43 is sent, and reactivated in order to report clearance of the fault.

The mobile terminal 53, having disconnected from the access point 10, (step 45) then seeks further beacons (step 46). To prevent it re-connecting to the same beacon, it may be arranged that a beacon that has transmitted a report then shuts down. In other embodiments the mobile terminal 53 is arranged to disregard any beacon for which it currently holds a fault report in its store 23. However, because the mobile terminal 53 is arranged to preferentially connect to access points broadcasting the alert SSID 102, it will connect to any other access points also broadcasting the alert SSID and will thus repeat the process 43, 44, 45 depicted in FIG. 4 for each such access point in turn.

Eventually the terminal 53 will have connected with all such access points broadcasting the alert beacon 102. As they have either shut down after transmitting their reports, or the mobile unit is arranged to disregard any such access points for which its store 23 already holds an alert message, the next beacon the mobile unit will connect to will be a public beacon 100 (step 47). This need not be immediate— the mobile terminal 53 may need to be moved before it comes into range of a working public access point 10.

Once the mobile unit has established contact with the network 3 the report data can be retrieved from the store 23 (step 48) and transmitted by way of the working access point to the service platform 71 (step 49).

In variants of the invention, the upload may be made using a different communications protocol and network 6, such as the SMS service of the GSM cellular radio system. In another variant, the human-interface output 27 of the user terminal 53 is arranged to display the data collected in the store 44 to the user. This arrangement is particularly suited to a situation in which the terminal 53 is intended for use by a field technician sent to identify and repair faults in the backhaul network 12.

What is claimed is:

1. A method for reporting faults in a telecommunications network wherein
    a wireless access point transmits one or more identity codes each identifying a respective functional interface of the wireless access point, through which backhaul connections are available, and the identity codes are detected by one or more mobile telecommunications terminals;
    the access point suspends transmission of one of the identity codes if a backhaul connection to the telecommunications network is lost, and replaces it with a special identity code, indicative of such lost connection, associated with a further functional interface, wherein when a mobile telecommunication terminal programmed to recognize the special identity code detects the special identity code transmitted by the access point, the mobile telecommunication terminal connects to the further functional interface specified by the special identity code, and the mobile terminal generates an alert message for transmission over another backhaul connection.

2. A method according to claim 1, wherein the mobile communications terminal selects connection to a wireless access point transmitting the special identity code in preference to any other identity code it can detect.

3. A method according to claim 1, wherein the mobile communications terminal, having generated the alert message, disconnects from the access point and seeks a second wireless access point through which to make a new wireless connection over which to transmit the alert message.

4. A method for reporting faults in a telecommunications network wherein
    a wireless access point transmits one or more identity codes identifying respective functional interfaces through which network connections are available,
    the access point suspends one of the identity codes if connection to the telecommunications network is lost, and replaces it with a special identity code, indicative of such lost connection, associated with a further functional interface, wherein a mobile telecommunication terminal detects the special identity code transmitted by the access point and generates an alert message, wherein the mobile communications terminal, having generated the alert message, disconnects from the access point and seeks a second wireless access point through which to make a new wireless connection over which to transmit the alert message,
    wherein the mobile communications terminal stores the alert message it has generated until it has established a connection to a report logging centre through such a second access point.

5. A method for reporting faults in a telecommunications network wherein
    a wireless access point transmits one or more identity codes identifying respective functional interfaces through which network connections are available,
    the access point suspends one of the identity codes if connection to the telecommunications network is lost, and replaces it with a special identity code, indicative of such lost connection, associated with a further functional interface, wherein a mobile telecommunication terminal detects the special identity code transmitted by the access point and generates an alert message, wherein the mobile communications terminal, having generated the alert message, disconnects from the access point and seeks a second wireless access point through which to make a new wireless connection over which to transmit the alert message;
    wherein the alert message is transmitted using a first access method and the mobile communications terminal transmits the alert message to a report logging centre using a second access method.

6. A method according to claim 1 wherein the alert message is displayed on an output of the mobile communications terminal.

7. A method according to claim 1 wherein the access point ceases transmission of the special identity code in response to an acknowledgement from the mobile communications terminal.

8. A method according to claim 1, wherein on detection of loss of connection to a network, the access point remains available for wireless connection to mobile communications terminals and capable of providing services not dependant on the telecommunications network, and continues to transmit an identity code in respect of such services.

9. An access point for wireless communication comprising:
    a wireless interface for communication with one or more mobile terminals;
    a network interface for connection to a communications network such that the mobile terminals may communicate with each other and the communications network;
    a processing system including storage for storing instructions and at one processor, the at least one processor executing the instructions so that the processing system is configured at least to:
        transmit one or more identity codes over the wireless interface, each of the one or more identify codes indicating a respective functional interface of the wireless access point, through which respective backhaul connections are available and control connection by mobile terminals to the access point,
        monitor the connection to the network interface, and
        provide control in response to the monitoring by suspending transmission of one of the identity codes if a backhaul connection to the network is lost, and replacing it with a special identity code indicative of such lost connection and associated with a further functional interface,
    wherein the access point is configured to communicate, through the further functional interfaces associated with the special identity code, with a mobile telecommunications terminal detecting the special identity code transmitted by the access point to generate an alert message for transmission by the mobile telecommunications terminal to another wireless access point through another backhaul connection.

10. An access point according to claim 9, wherein the processing system is further configured to detect an acknowledgement of the special identity code and to cease transmission of the special identity code in response to said acknowledgement.

11. An access point according to claim 9, wherein the processing system is further configured to transmit a further identity code in respect of non-network services, the further identity code being transmitted irrespective of whether a connection to the telecommunications network is available.

12. A mobile communications terminal comprising:
a wireless interface for wireless communication with a network through a wireless access point, and
at least one processor for detecting an identity code out of one or more identity codes identifying one or more respective functional interfaces of a wireless access point, and establishing connection with the wireless access point over a functional interface out of the functional interfaces in response to detection of the identity code associated with the functional interface transmitted by the access point identifying availability of backhaul connections over the functional interface,
the mobile communications terminal being arranged to generate an alert message in response to detection of a predetermined special identity code, associated with a further functional interface and received from the wireless access point, indicative that a backhaul connection has been interrupted between the network and the access point transmitting the special identity code, the mobile communications terminal being arranged to connect to the further functional interface specified by the special identity code,
characterised in that the mobile communications terminal is arranged to disconnect from the access point having generated the alert message, and to attempt to make a new wireless connection to a second access point to transmit the alert message.

13. A mobile communications terminal according to claim 12, wherein the mobile communications terminal is arranged to select connection to a wireless access point transmitting the special identity code, over the associated functional interface, in preference to any wireless access points transmitting other identity codes.

14. A mobile communications terminal comprising:
a wireless interface for wireless communication with a network through a wireless access point, and
at least one processor for establishing connection with a wireless access point over a functional interface in response to detection of an identity code associated with the functional interface transmitted by the access point identifying availability of network connections over the functional interface,
the mobile communications terminal being arranged to generate an alert message in response to detection of a predetermined special identity code, associated with a further functional interface, indicative that connection has been interrupted between the network and the access point transmitting the special identity code,
characterised in that the mobile communications terminal is arranged to disconnect from the access point having generated the alert message, and to attempt to make a new wireless connection to a second access point,
wherein the mobile communications terminal is arranged to select connection to a wireless access point transmitting the special identity code, over the associated functional interface, in preference to any wireless access points transmitting other identity codes; and
wherein the mobile communications terminal has a store for storing the alert message it has generated, and has a transmitter for transmitting the alert message to a report logging centre through the second access point.

15. A mobile communications terminal comprising:
a wireless interface for wireless communication with a network through a wireless access point, and
at least one processor for establishing connection with a wireless access point over a functional interface in response to detection of an identity code associated with the functional interface transmitted by the access point identifying availability of network connections over the functional interface,
the mobile communications terminal being arranged to generate an alert message in response to detection of a predetermined special identity code, associated with a further functional interface, indicative that connection has been interrupted between the network and the access point transmitting the special identity code,
characterised in that the mobile communications terminal is arranged to disconnect from the access point having generated the alert message, and to attempt to make a new wireless connection to a second access point,
wherein the mobile communications terminal is arranged to select connection to a wireless access point transmitting the special identity code, over the associated functional interface, in preference to any wireless access points transmitting other identity codes, and
wherein the wireless interface is configured to establish wireless communication through two or more media, and arranged such that an alert message generated in respect of an interruption in communication over a first access medium may be transmitted to a report logging centre using a second access medium.

16. A mobile communications terminal according to claim 12, having a display output for displaying the alert messages.

17. The method of claim 1, further comprising the mobile communications terminal transmitting the alert message over the another backhaul connection to a second wireless access point.

18. The method of claim 4, further comprising the mobile communications terminal transmitting the alert message over the new wireless connection to the second wireless access point.

19. The method of claim 5, further comprising the mobile communications terminal transmitting the alert message over the new wireless connection to the second wireless access point.

* * * * *